United States Patent
Diard

(10) Patent No.: US 8,077,181 B2
(45) Date of Patent: *Dec. 13, 2011

(54) ADAPTIVE LOAD BALANCING IN A MULTI PROCESSOR GRAPHICS PROCESSING SYSTEM

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/817,997

(22) Filed: Jun. 17, 2010

(65) Prior Publication Data

US 2010/0271375 A1    Oct. 28, 2010

Related U.S. Application Data

(63) Continuation of application No. 11/376,587, filed on Mar. 14, 2006, now abandoned, which is a continuation of application No. 10/642,905, filed on Aug. 18, 2003, now Pat. No. 7,075,541.

(51) Int. Cl.
G06F 15/80 (2006.01)
G06F 9/46 (2006.01)
G09G 5/36 (2006.01)

(52) U.S. Cl. .......................... 345/505; 345/556; 718/105
(58) Field of Classification Search .......... 345/501–506, 345/522, 530, 556; 718/100, 102, 105
See application file for complete search history.

(56) References Cited

U.S. PATENT DOCUMENTS

| | | | |
|---|---|---|---|
| 5,031,089 A | 7/1991 | Liu et al. |
| 5,757,385 A | 5/1998 | Narayanaswami et al. |
| 5,790,130 A | 8/1998 | Gannett |
| 5,841,444 A | 11/1998 | Mun |
| 5,959,689 A | 9/1999 | De Lange et al. |
| 6,023,281 A | 2/2000 | Grigor et al. |
| 6,078,339 A | 6/2000 | Meinerth et al. |
| 6,191,800 B1 | 2/2001 | Arenburg et al. |
| 6,259,461 B1 | 7/2001 | Brown |
| 6,266,072 B1 | 7/2001 | Koga et al. |

(Continued)

FOREIGN PATENT DOCUMENTS

EP          0571969         5/2003

OTHER PUBLICATIONS

Molnar et al., "PixelFlow: High-speed Rendering Using Image Composition", Computer Graphics (Proceedings of SIGGRAPH 92), vol. 26, No. 2, pp. 231-240, Jul. 1992.

(Continued)

*Primary Examiner* — Joni Hsu
(74) *Attorney, Agent, or Firm* — Kilpatrick Townsend & Stockton LLP

(57) ABSTRACT

Systems and methods for balancing a load among multiple graphics processors that perform different portions of a rendering task. A rendering task is partitioned into portions for each of two (or more) graphics processors. The graphics processors perform their respective portions of the rendering task and return feedback data indicating completion of the assigned portion. Based on the feedback data, an imbalance can be detected between respective loads of two of the graphics processors. In the event that an imbalance exists, the rendering task is re-partitioned to increase the portion assigned to the less heavily loaded processor and to decrease the portion assigned to the more heavily loaded processor.

19 Claims, 6 Drawing Sheets

U.S. PATENT DOCUMENTS

| | | |
|---|---|---|
| 6,317,133 B1 | 11/2001 | Root et al. |
| 6,362,818 B1 | 3/2002 | Gardiner et al. |
| 6,445,391 B1 | 9/2002 | Sowizral et al. |
| 6,469,746 B1 | 10/2002 | Maida |
| 6,473,086 B1 | 10/2002 | Morein et al. |
| 6,570,571 B1 | 5/2003 | Morozumi |
| 6,651,082 B1 | 11/2003 | Kawase et al. |
| 6,724,390 B1 | 4/2004 | Dragony et al. |
| 6,747,654 B1 | 6/2004 | Laksono et al. |
| 6,781,590 B2 | 8/2004 | Katsura et al. |
| 6,853,381 B1 | 2/2005 | Grigor et al. |
| 7,075,541 B2 | 7/2006 | Diard |
| 2002/0099844 A1* | 7/2002 | Baumann et al. ............ 709/232 |
| 2003/0128216 A1 | 7/2003 | Walls et al. |
| 2003/0169269 A1 | 9/2003 | Sasaki et al. |
| 2004/0003023 A1* | 1/2004 | Gootherts et al. ............ 709/107 |
| 2004/0075623 A1 | 4/2004 | Hartman |
| 2004/0125111 A1* | 7/2004 | Tang-Petersen et al. ..... 345/506 |
| 2004/0189650 A1 | 9/2004 | Deering |
| 2005/0012749 A1 | 1/2005 | Gonzalez |
| 2005/0088445 A1 | 4/2005 | Gonzalez |

OTHER PUBLICATIONS

Whitman, "Dynamic Load Balancing for Parallel Polygon Rendering" IEEE Computer Graphics and Applications, IEEE Inc. New York, U.S., vol. 14, No. 4, pp. 41-48, Jul. 1, 1994.

* cited by examiner

ADAPTIVE LOAD BALANCING IN A MULTI PROCESSOR GRAPHICS PROCESSING SYSTEM

CROSS-REFERENCES TO RELATED APPLICATIONS

This application is a continuation of U.S. patent application Ser. No. 11/376,587 entitled "Adaptive Load Balancing In a Multi-Processor Graphics Processing System", filed Mar. 14, 2006 now abandoned, which is a continuation of U.S. patent application Ser. No. 10/642,905, entitled "Adaptive Load Balancing In a Multi-Processor Graphics Processing System" filed Aug. 18, 2003 now U.S. Pat. No. 7,075,541. The respective disclosures of these applications are incorporated herein by reference for all purposes.

The present disclosure is related to the following commonly assigned co pending U.S. application Ser. No. 10/643,072, filed Aug. 18, 2003, entitled "Private Addressing in a Multi Processor Graphics Processing System" and application Ser. No. 10/639,893, filed Aug. 12, 2003, entitled "Programming Multiple Chips from a Command Buffer," the respective disclosures of which are incorporated herein by reference for all purposes.

BACKGROUND OF THE INVENTION

The present invention relates generally to graphics processing subsystems with multiple processors and in particular to adaptive load balancing for such graphics processing subsystems.

Graphics processing subsystems are designed to render realistic animated images in real time, e.g., at 30 or more frames per second. These subsystems are most often implemented on expansion cards that can be inserted into appropriately configured slots on a motherboard of a computer system and generally include one or more dedicated graphics processing units (GPUs) and dedicated graphics memory. The typical GPU is a highly complex integrated circuit device optimized to perform graphics computations (e.g., matrix transformations, scan-conversion and/or other rasterization techniques, texture blending, etc.) and write the results to the graphics memory. The GPU is a "slave" processor that operates in response to commands received from a driver program executing on a "master" processor, generally the central processing unit (CPU) of the system.

To meet the demands for realism and speed, some GPUs include more transistors than typical CPUs. In addition, graphics memories have become quite large in order to improve speed by reducing traffic on the system bus; some graphics cards now include as much as 256 MB of memory. But despite these advances, a demand for even greater realism and faster rendering persists.

As one approach to meeting this demand, some manufacturers have begun to develop "multi-chip" graphics processing subsystems in which two or more GPUs, usually on the same card, operate in parallel. Parallel operation substantially increases the number of rendering operations that can be carried out per second without requiring significant advances in GPU design. To minimize resource conflicts between the GPUs, each GPU is generally provided with its own dedicated memory area, including a display buffer to which the GPU writes pixel data it renders.

In a multi-chip system, the processing burden may be divided among the GPUs in various ways. For example, each GPU may be instructed to render pixel data for a different portion of the displayable image, such as a number of lines of a raster-based display. The image is displayed by reading out the pixel data from each GPU's display buffer in an appropriate sequence. As a more concrete example, a graphics processing subsystem may use two GPUs to generate a displayable image consisting of M rows of pixel data; the first GPU can be instructed to render rows 1 through P, while the second GPU is instructed to render rows P+1 through M. To preserve internal consistency of the displayed image ("frame coherence"), each GPU is prevented from rendering a subsequent frame until the other GPU has also finished the current frame so that both portions of the displayed image are updated in the same scanout pass.

Ideally, the display area (or screen) is partitioned in such a way that each GPU requires an equal amount of time to render its portion of the image. If the rendering times are unequal, a GPU that finishes its portion of the frame first will be idle, wasting valuable computational resources. In general, simply partitioning the display area equally among the GPUs is not an optimal solution because the rendering complexity of different parts of an image can vary widely. For example, in a typical scene from a video game, the foreground characters and/or vehicles—which are often complex objects rendered from a large number of primitives—tend to appear near the bottom of the image, while the top portion of the image is often occupied by a relatively static background that can be rendered from relatively few primitives and texture maps. When such an image is split into top and bottom halves, the GPU that renders the top half will generally complete its portion of the image, then wait for the other GPU to finish. To avoid this idle time, it would be desirable to divide the display area unequally, with the top portion being larger than the bottom portion. In general, the optimal division depends on the particular scene being rendered and may vary over time even within a single video game or other graphics application.

It would, therefore, be desirable to provide a mechanism whereby the processing load on each GPU can be monitored and the division of the display area among the GPUs can be dynamically adjusted to balance the loads.

BRIEF SUMMARY OF THE INVENTION

The present invention provides systems and methods for balancing a load among multiple graphics processors that render different portions of a frame.

According to one aspect of the invention, a method is provided for load balancing for graphics processors configured to operate in parallel. A display area is partitioned into at least a first portion to be rendered by a first one of the graphics processors and a second portion to be rendered by a second one of the graphics processors. The graphics processors are instructed to render a frame, wherein the first and second graphics processors perform rendering for the first and second portions of the display area, respectively. Feedback data for the frame is received from the first and second graphics processors, the feedback data reflecting respective rendering times for the first and second graphics processors. Based on the feedback data, it is determined whether an imbalance exists between respective loads of the first and second graphics processors. In the event that an imbalance exists, based on the feedback data, the one of the first and second graphics processors that is more heavily loaded is identified; the display area is re-partitioned to increase a size of the one of the first and second portions of the display area that is rendered by the more heavily loaded one of the first and second graphics processors and to decrease a size of the other of the first and second portions of the display area.

According to another aspect of the invention, a method is provided for load balancing for graphics processors configured to operate in parallel. A display area is partitioned into at least a first portion to be rendered by a first graphics processor and a second portion to be rendered by a second graphics processor. The graphics processors are instructed to render a number of frames, wherein the first and second graphics processors perform rendering for the first and second portions of the display area, respectively. Feedback data for each of the frames is received from the first and second graphics processors, the feedback data for each frame indicating which of the first and second graphics processors was last to finish rendering the frame. Based on the feedback data, it is determined whether an imbalance exists between respective loads of the first and second graphics processors. In the event that an imbalance exists, based on the feedback data, the one of the first and second graphics processors that is more heavily loaded is identified; the display area is re-partitioned to increase a size of the one of the first and second portions of the display area that is rendered by the more heavily loaded one of the first and second graphics processors and to decrease a size of the other of the first and second portions of the display area.

In some embodiments, a storage location is associated with each one of the frames, and receiving the feedback data for each of the frames includes instructing the first graphics processor to store a first processor identifier in the associated one of the storage locations for each of the frames after rendering the first portion of the display area for that frame; and instructing the second graphics processor to store a second processor identifier different from the first processor identifier in the associated one of the storage locations for each of the frames after rendering the second portion of the display area for that frame. Each of the first and second identifiers may have a different numeric value and determination of whether an imbalance exists may include computing a load coefficient from the numeric values stored in the storage locations. The load coefficient may be, e.g., an average of the recorded numeric values that can be compared to an arithmetic mean of the numeric values of the processor identifiers in order to determine whether an imbalance exists.

In some embodiments, during the act of re-partitioning, an amount by which the size of the first portion of the display area is reduced depends at least in part on a magnitude of the difference between the load coefficient and the arithmetic mean.

In some embodiments, the plurality of graphics processors further includes a third graphics processor. During the act of partitioning, the display area may be partitioned into at least three bands including a first band that corresponds to the first portion of the display area, a second band that corresponds to the second portion of the display area, and a third band that corresponds to a third portion of the display area to be rendered by the third graphics processor, wherein the first band is adjacent to the second band and the second band is adjacent to the third band. Additional feedback data may be received for each of the frames, the additional feedback data indicating which of the second and third graphics processors was last to finish rendering the frame. Based on the feedback data, it may be determined whether an imbalance exists between respective loads of the second and third graphics processors. In the event that an imbalance exists, it may be determined which of the second and third graphics processors is more heavily loaded, and the display area may be re-partitioned to increase a size of the one of the second and third portions of the display area that is rendered by the more heavily loaded one of the second and third graphics processors and to decrease a size of the other of the second and third portions of the display area.

According to yet another aspect of the invention, a driver for a graphics processing subsystem having multiple graphics processors includes a command stream generator, an imbalance detecting module, and a partitioning module. The command stream generator is configured to generate a command stream for the graphics processors, the command stream including a set of rendering commands for a frame and an instruction to each of a first one and a second one of the graphics processors to transmit feedback data indicating that the respective processor has executed the set of rendering commands. The imbalance detecting module is configured to receive the feedback data transmitted by the first and second graphics processors and to determine from the feedback data whether an imbalance exists between respective loads of the first and second graphics processors. The partitioning module is configured to partition a display area into a plurality of portions, each portion to be rendered by a different one of the graphics processors, the plurality of portions including a first portion to be rendered by the first graphics processor and a second portion to be rendered by the second graphics processor. The partitioning module is further configured such that, in response to a determination by the imbalance detecting module that an imbalance exists, the partitioning module increases a size of the one of the first and second portions of the display area that is rendered by the more heavily loaded one of the first and second graphics processors and decreases a size of the other of the first and second portions of the display area.

The following detailed description together with the accompanying drawings will provide a better understanding of the nature and advantages of the present invention.

DETAILED DESCRIPTION OF THE INVENTION

The present invention provides systems and methods for balancing a load among multiple graphics processors that render different portions of a frame. In some embodiments, load balancing is performed by determining whether one of two graphics processors finishes rendering a frame last more often than the other. If one of the processors finishes last more often, a portion of the processing burden (e.g., a number of lines of pixels to render) is shifted from that processor to the other processor. The comparison can be repeated and the load adjusted as often as desired. The technique of pairwise load comparisons and balancing can be extended to systems with any number of graphics processors.

Figure 1:
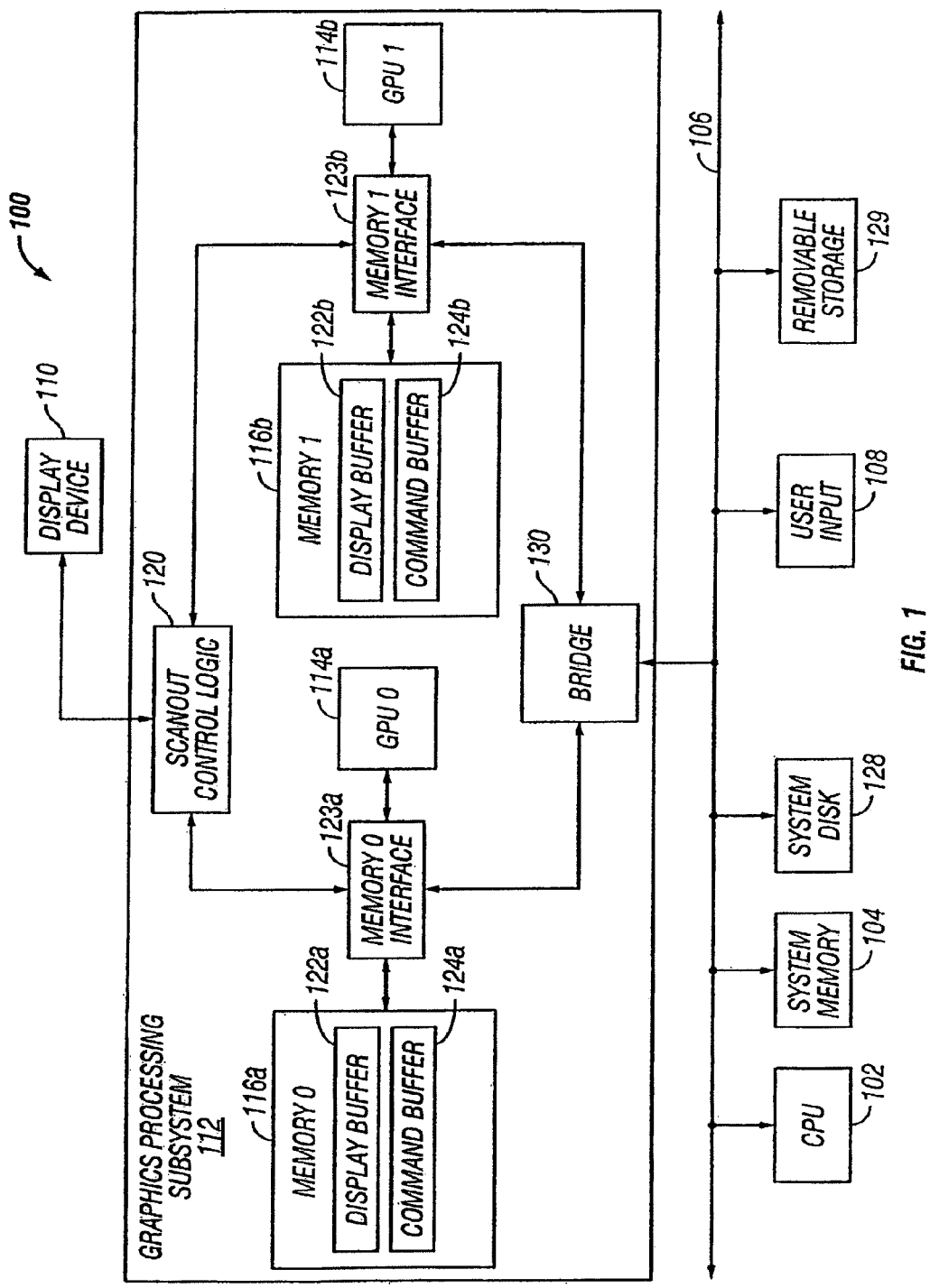
FIG. 1 is a simplified block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106.

Graphics processing subsystem 112 is advantageously implemented using a printed circuit card adapted to be connected to an appropriate bus slot (e.g., PCI or AGP) on a motherboard of system 100. In this embodiment, graphics processing subsystem 112 includes two (or more) graphics processing units (GPUs) 114a, 114b, each of which is advantageously implemented as a separate integrated circuit device (e.g., programmable processor or application-specific integrated circuit (ASIC)). GPUs 114a, 114b are configured to perform various rendering functions in response to instructions (commands) received via system bus 106. In some embodiments, the rendering functions correspond to various steps in a graphics processing pipeline by which geometry data describing a scene is transformed to pixel data for displaying on display device 110. These functions can include, for example, lighting transformations, coordinate transformations, scan-conversion of geometric primitives to rasterized data, shading computations, shadow rendering, texture blending, and so on. Numerous implementations of rendering functions are known in the art and may be implemented in GPUs 114a, 114b. GPUs 114a, 114b are advantageously configured identically so that any graphics processing instruction can be executed by either GPU with substantially identical results.

Each GPU 114a, 114b has an associated graphics memory 116a, 116b, which may be implemented using one or more integrated-circuit memory devices of generally conventional design. Graphics memories 116a, 116b may contain various physical or logical subdivisions, such as display buffers 122a, 122b and command buffers 124a, 124b. Display buffers 122a, 122b store pixel data for an image (or for a part of an image) that is read by scanout control logic 120 and transmitted to display device 110 for display. This pixel data may be generated from scene data provided to GPUs 114a, 114b via system bus 106 or generated by various processes executing on CPU 102 and provided to display buffers 122a, 122b via system bus 106. In some embodiments, display buffers 122a, 122b can be double buffered so that while data for a first image is being read for display from a "front" buffer, data for a second image can be written to a "back" buffer without affecting the currently displayed image. Command buffers 124a, 124b are used to queue commands received via system bus 106 for execution by respective GPUs 114a, 114b, as described below. Other portions of graphics memories 116a, 116b may be used to store data required by respective GPUs 114a, 114b (such as texture data, color lookup tables, etc.), executable program code for GPUs 114a, 114b, and so on.

For each graphics memory 116a, 116b, a memory interface 123a, 123b is also provided for controlling access to the respective graphics memory. Memory interfaces 123a, 123b can be integrated with respective GPUs 114a, 114b or with respective memories 116a, 116b, or they can be implemented as separate integrated circuit devices. In one embodiment, all memory access requests originating from GPU 114a are sent to memory interface 123a. If the target address of the request corresponds to a location in memory 116a, memory interface 123a accesses the appropriate location; if not, then memory interface 123a forwards the request to a bridge unit 130, which is described below. Memory interface 123a also receives all memory access requests targeting locations in memory 116a; these requests may originate from scanout control logic 120, CPU 102, or other system components, as well as from GPU 114a or 114b. Similarly, memory interface 123b receives all memory access requests that originate from GPU 114b or that target locations in memory 116b.

Bridge unit 130 is configured to manage communication between components of graphics processing subsystem 112 (including memory interfaces 123a, 123b) and other components of system 100. For example, bridge unit 130 may receive all incoming data transfer requests from system bus 106 and distribute (or broadcast) the requests to one or more of memory interfaces 123a, 123b. Bridge unit 130 may also receive data transfer requests originating from components of graphics processing subsystem 112 (such as GPUs 114a, 114b) that reference memory locations external to graphics processing subsystem 112 and transmit these requests via system bus 106. In addition, in some embodiments, bridge unit 130 facilitates access by either of GPUs 114a, 114b to the memory 116b, 116a associated with the other of GPUs 114a, 114b. Examples of implementations of bridge unit 130 are described in detail in the above-referenced co-pending application Ser. No. 10/643,072; a detailed description is omitted herein as not being critical to understanding the present invention.

In operation, a graphics driver program (or other program) executing on CPU 102 delivers rendering commands and associated data for processing by GPUs 114a, 114b. In some embodiments, CPU 102 communicates asynchronously with each of GPUs 114a, 114b using a command buffer, which may be implemented in any memory accessible to both the CPU 102 and the GPUs 114a, 114b. In one embodiment, the command buffer is stored in system memory 104 and is accessible to GPUs 114a, 114b via direct memory access (DMA) transfers. In another embodiment, each GPU 114a, 114b has a respective command buffer 124a, 124b in its memory 116a, 116b; these command buffers are accessible to CPU 102 via DMA transfers. The command buffer stores a number of rendering commands and sets of rendering data. In one embodiment, a rendering command may be associated with rendering data, with the rendering command defining a set of rendering operations to be performed by the GPU on the associated rendering data. In some embodiments, the rendering data is stored in the command buffer adjacent to the associated rendering command.

CPU 102 writes a command stream including rendering commands and data sets to the command buffer for each GPU 114a, 114b (e.g., command buffers 124a, 124b). In some embodiments, the same rendering commands and data are written to each GPU's command buffer (e.g., using a broadcast mode of bridge chip 130); in other embodiments, CPU 102 writes to each GPU's command buffer separately. Where the same command stream is provided to both GPUs 114a, 114b, the command stream may include tags or other parameters to indicate which of the GPUs should process a particular command.

Each command buffer 124a, 124b is advantageously implemented as a first-in, first-out buffer (FIFO) that is written by CPU 102 and read by the respective one of GPUs 114a, 114b; reading and writing can occur asynchronously. In one embodiment, CPU 102 periodically writes new commands and data to each command buffer at a location determined by a "put" pointer, which CPU 102 increments after each write. Asynchronously, each of GPUs 114a, 114b continuously reads and processes commands and data sets previously stored in its command buffer 124a, 124b; each GPU 114a, 114b maintains a "get" pointer to identify the read location in its command buffer 124a, 124b, and the get pointer is incremented after each read. Provided that CPU 102 stays sufficiently far ahead of GPUs 114a, 114b, the GPUs are able to render images without incurring idle time waiting for CPU 102. In some embodiments, depending on the size of the command buffer and the complexity of a scene, CPU 102 may write commands and data sets for frames several frames ahead of a frame being rendered by GPUs 114a, 114b.

The command buffer may be of fixed size (e.g., 5 megabytes) and may be written and read in a wraparound fashion (e.g., after writing to the last location, CPU 102 may reset the "put" pointer to the first location). A more detailed description of embodiments of command buffers and techniques for writing commands and data to command buffers in a multi-chip graphics processing system is provided in the above-referenced co-pending application Ser. No. 10/639,893.

Scanout control logic 120 reads pixel data for an image from frame buffers 122a, 122b and transfers the data to display device 110 to be displayed. Scanout can occur at a constant refresh rate (e.g., 80 Hz); the refresh rate can be a user selectable parameter and need not correspond to the rate at which new frames of image data are written to display buffers 122a, 122b. Scanout control logic 120 may also perform other operations such as adjustment of color values, generating composite screen images by combining the pixel data in either of the display buffers 122a, 122b with data for a video or cursor overlay image or the like obtained from either of graphics memories 116a, 116b or another data source (not shown), digital to analog conversion, and so on.

GPUs 114a, 114b are advantageously operated in parallel to increase the rate at which new frames of image data can be rendered. In one embodiment, referred to herein as "spatial parallelism," each GPU 114a, 114b generates pixel data for a different portion (e.g., a horizontal or vertical band) of each frame; scanout control logic 120 reads a first portion (e.g., the top portion) of the pixel data for a frame from display buffer 122a and a second portion (e.g., the bottom portion) from display buffer 122b. For spatial parallelism, rendering commands and accompanying data may be written in parallel to both command buffers 124a, 124b (e.g., using a broadcast mode of bridge unit 130), but commands and/or data can also be selectively written to one or more of the command buffers (e.g., different parameters for a command that defines the viewable area might be written to the different command buffers so that each GPU renders the correct portion of the image).

Figure 2:
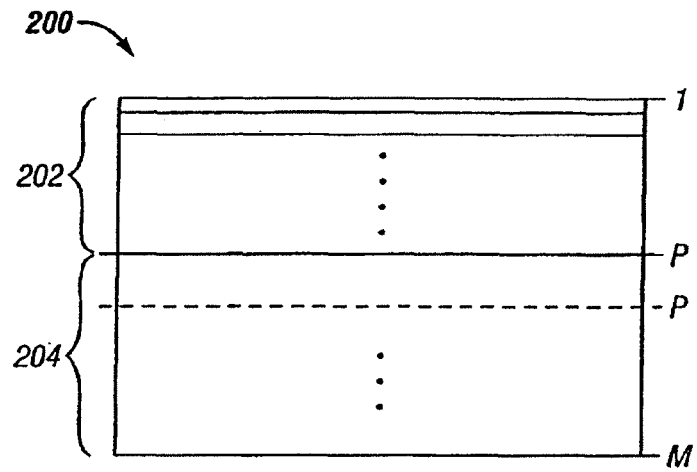
FIG. 2 is an illustration of a display area showing spatial parallelism according to an embodiment of the present invention.

An example of spatial parallelism is shown in FIG. 2. A display area 200 consists of M lines (horizontal rows) of pixel data. Lines 1 through P (corresponding to top portion 202 of display area 200) are rendered by GPU 114a of FIG. 1, while lines P+1 through M (corresponding to bottom portion 204 of display area 200) are rendered by GPU 114b. In this embodiment, each GPU 114a, 114b allocates a display buffer 122a, 122b in its local memory 116a, 116b that is large enough to store an entire frame (M lines) of data but only fills the lines it renders (lines 1 through P for GPU 114a and lines P+1 through M for GPU 114b). During each display refresh cycle, scanout control logic 120 reads the first P lines from display buffer 122a, then switches to display buffer 122b to read lines P+1 through M. To determine which lines each GPU renders, a "clip rectangle" is set for each GPU; for example, GPU 114a may have a clip rectangle corresponding to top portion 202 of frame 200 while GPU 114b has a clip rectangle corresponding to bottom portion 204 of frame 200.

In accordance with an embodiment of the present invention, each GPU provides feedback data to the graphics driver program (or another program executing on CPU 102). The feedback data provides information about the time taken by a particular GPU to render its portion of the image. The graphics driver program uses this feedback to dynamically balance the load among the GPUs by modifying the clip rectangle from time to time, e.g., by changing the dividing line to a different line P', based on the relative loads on the two GPUs.

Figure 3:
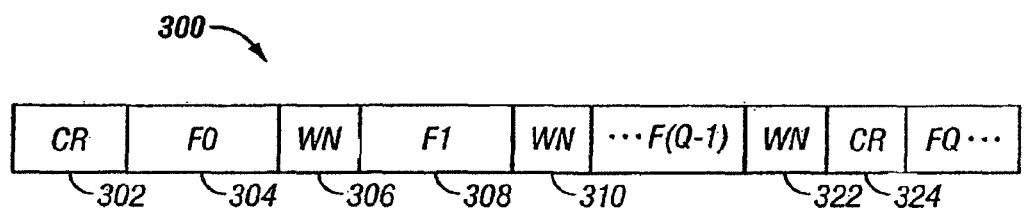
FIG. 3 is an illustration of a command stream according to an embodiment of the present invention.

An example of a command stream 300 that may be written to either (or both) of command buffers 124a, 124b is shown in FIG. 3. The stream starts with a "clip rectangle" (CR) command 302, which defines the viewable area of the image. For example, the clip rectangle for GPU 114a may be defined to include lines 1 through P of display area 200 (FIG. 2), while the clip rectangle for GPU 114b includes lines P+1 through M. As used herein, the term "clip rectangle" is to be understood as including any particular command or terminology associated with defining the visible portion of the image plane for a frame or image, or more specifically, the portion of the image plane that a particular GPU is instructed to render.

The clip rectangle command is followed by one or more rendering commands 304 and associated rendering data for a frame F0. These commands and data may include, for instance, definitions of primitives and/or objects making up the scene, coordinate transformations, lighting transformations, shading commands, texture commands, and any other type of rendering commands and/or data, typically culminating in the writing of pixel data to display buffers 122a, 122b (and reading of that data by scanout control logic 120).

Following the last rendering command 304 for frame F0 is a "write notifier" (WN) command 306. The write notifier command instructs the GPU to write feedback data to system memory indicating that it has finished the frame F0. This feedback data can be read by the graphics driver program and used to balance the load among the GPUs. Specific embodiments of feedback data are described below.

Write notifier command 306 is followed by rendering commands 308 and associated rendering data for the next frame F1, which in turn are followed by another write notifier command 310, and so on. After some number (Q) of frames, there is a write notifier command 322 followed by a new clip rectangle command 324. At this point, the clip rectangles for each GPU may be modified by the graphics driver program based on the feedback data received in response to the various write notifier commands (e.g., commands 306, 310). For example, where the display area is divided as shown in FIG. 2, the value of P may be modified (e.g., to P') in response to feedback data: if the GPU that processes top portion 202 tends to finish its frames first, the value of P is increased, and if the GPU that processes bottom portion 204 tends to finish first, the value of P is decreased. Specific embodiments of re-partitioning a display area in response to feedback data are described below.

It will be appreciated that the system described herein is illustrative and that variations and modifications are possible. For instance, while two GPUs, with respective memories, are shown, any number of GPUs can be used, and multiple GPUs might share a memory. The memory interfaces described herein may be integrated with a GPU and/or a memory in a single integrated circuit device (chip) or implemented as separate chips. The bridge unit may be integrated with any of the memory interface and/or GPU chips, or may be implemented on a separate chip. The various memories can be implemented using one or more integrated circuit devices. Graphics processing subsystems can be implemented using various expansion card formats, including PCI, PCIX (PCI Express), AGP (Accelerated Graphics Port), and so on. Some or all of the components of a graphics processing subsystem may be mounted directly on a motherboard; for instance, one of the GPUs can be a motherboard-mounted graphics co-processor. Computer systems suitable for practicing the present invention may also include various other components, such as high-speed DMA (direct memory access) chips, and a single system may implement multiple bus protocols (e.g., PCI and AGP buses may both be present) with appropriate components provided for interconnecting the buses. One or more command buffers may be implemented in the main system memory rather than graphics subsystem memory, and commands may include an additional parameter indicating which GPU(s) is (are) to receive or process the command. While the present description may refer to asynchronous operation, those skilled in the art will recognize that the invention may also be implemented in systems where the CPU communicates synchronously with the GPUs.

Embodiments of feedback data and load balancing techniques based on the feedback data will now be described. In one embodiment, each GPU 114a, 114b is assigned an identifier that it stores in a designated location in its local memory 116a, 116b; the identifier may also be stored in an on-chip register of each GPU 114a, 114b. For example, GPU 114a can be assigned an identifier "0" while GPU 114b is assigned an identifier "1." These identifiers, which advantageously have numerical values, may be assigned, e.g., at system startup or application startup. As described below, the identifier may be used as feedback data for purposes of load balancing.

Figure 4:
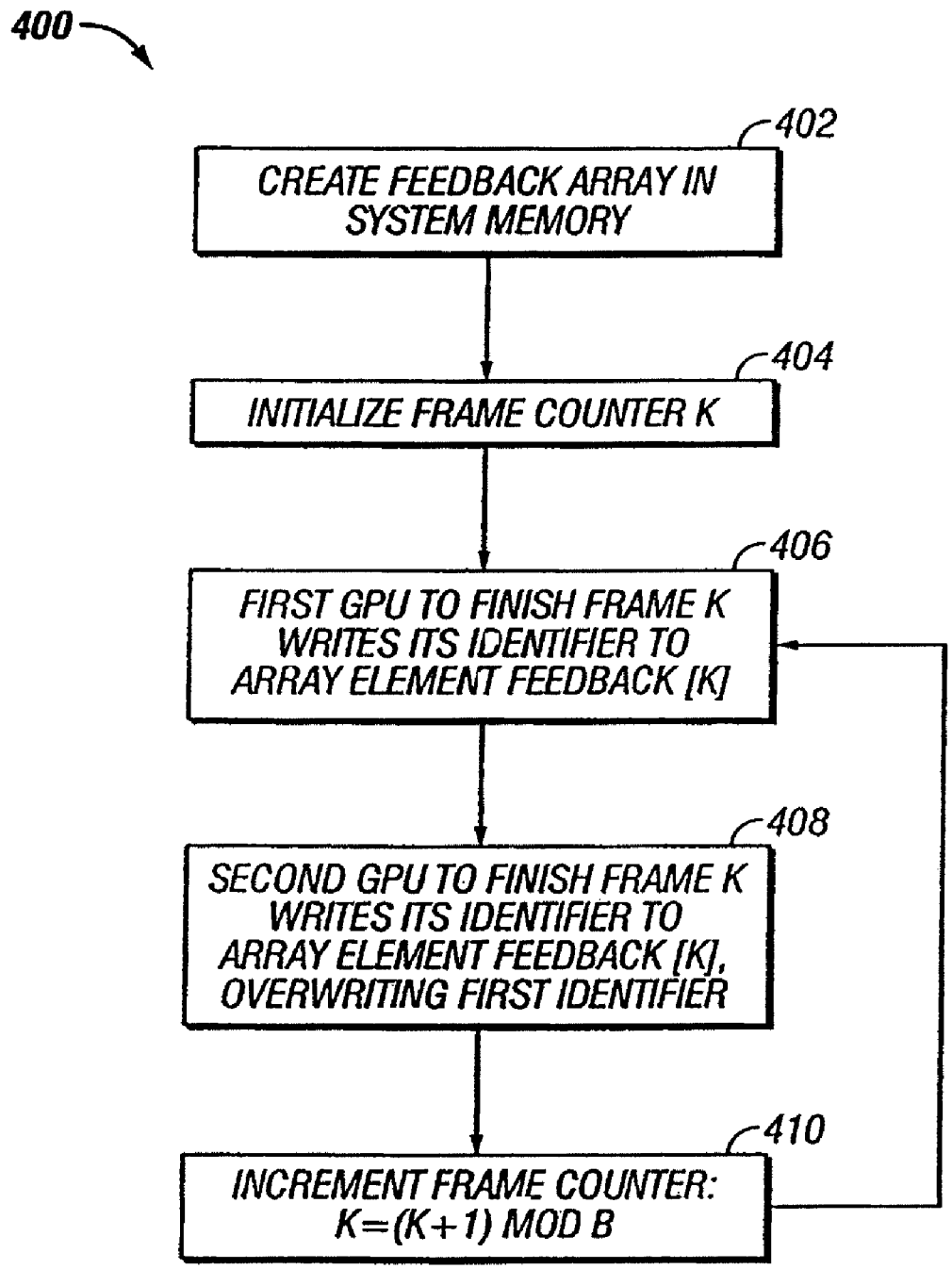
FIG. 4 is a flow diagram of a process for providing feedback data from a graphics processing unit according to an embodiment of the present invention.

FIG. 4 illustrates a process 400 for recording feedback data including the identifiers of the GPUs. At step 402, the graphics driver program creates a feedback array (referred to herein as feedback[0:B−1]) of dimension B (e.g., 5, 10, 20, 50, etc.) in system main memory, and at step 404, a frame counter k is initialized (e.g., to zero). In this embodiment, the write notifier command following each frame k instructs the GPU to copy its identifier from its local memory to the location feedback[k] in system main memory, e.g., using a DMA block transfer operation ("Blit") or any other operation by which a GPU can write data to system main memory. Thus, at step 406, the first GPU to finish rendering frame k writes its identifier to the array location feedback[k]. At step 408, the second GPU to finish rendering the frame k writes its identifier to the array location feedback[k], overwriting the first GPU's identifier. It is to be understood that either GPU 114a, 114b might finish first, and that a GPU that is first to finish one frame first might be last to finish another frame.

It should be noted that in this embodiment each GPU is instructed to write to the same location in system memory; as a result, the second GPU to finish frame k overwrites the identifier of the first GPU in array element feedback[k]. Thus, after both GPUs have finished a particular frame k, the value stored in feedback[k] indicates which GPU was last to finish the frame k.

At step 410, the frame counter is incremented to the next frame, modulo B. This causes the feedback array to be overwritten in a circular fashion every B frames, so that the contents of the array generally reflect the last B frames that have been rendered. In one embodiment, the frame counter value for each frame is provided with the write notification command to each GPU; in another embodiment, each GPU maintains its own frame counter and updates the frame counter after writing the identifier to the appropriate location in system memory in response to the write notifier command.

Figure 5:
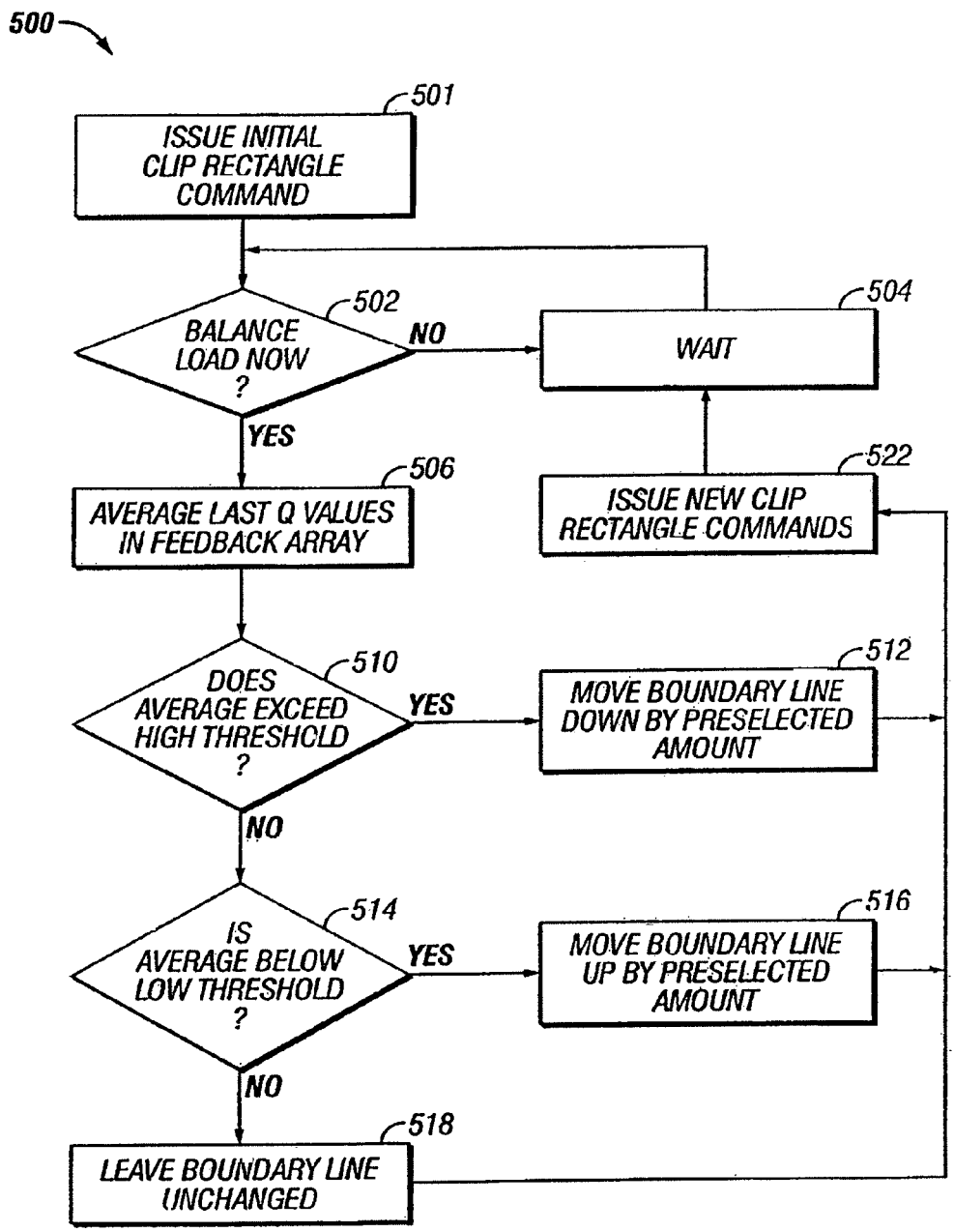
FIG. 5 is a flow diagram of a process for balancing a load between two graphics processing units according to an embodiment of the present invention.

The information in the feedback array can be used by a graphics driver program (or another program executing on CPU 102) for load balancing, as illustrated in FIG. 5. Process 500 is a shown as a continuous loop in which the relative load on the GPUs is estimated from time to time by averaging values stored in the feedback array and the load is adjusted based on the estimate. In this embodiment, there are two GPUs (e.g., GPUs 114a, 114b of FIG. 1) operating in spatial parallelism and the display area is divided as shown in FIG. 2. The GPU assigned to the top portion 202 of the display area has identifier "0" and is referred to herein as GPU-0, and the GPU assigned to the bottom portion 204 has identifier "1" and is referred to herein as GPU-1. Load balancing is done by adjusting the clip rectangle for each GPU, determined in this example by the location of the boundary line P in FIG. 2.

At step 501, a clip rectangle command is issued (e.g., placed in the command stream) for each GPU. This initial clip rectangle command may partition the display area equally between the GPUs (e.g., using P=M/2) or unequally. For example, a developer of an application program may empirically determine a value of P that approximately balances that load and provide that value to the graphics driver program via an appropriate command. The initial size of the portion of the display area allocated to each GPU is not critical, as the sizes will typically be changed from time to time to balance the load.

At step 502, the graphics driver determines whether it is time to balance the load between the GPUs. Various criteria may be used in this determination; for example, the graphics driver may balance the load after some number (Q) of frames, where Q might be, e.g., 1, 2, 5, 10, 20, etc. Q advantageously does not exceed the number of entries B in the feedback array, but Q need not be equal to B. Alternatively, load balancing may be performed at regular time intervals (e.g., once per second) or according to any other criteria. If it is not time to balance the load, process 500 waits (step 504), then checks the load balancing criteria again at step 502.

When it is time to balance the load, the graphics driver averages Q values from the feedback array at step 506, thereby computing a load coefficient. In one embodiment Q is equal to B (the length of the feedback array), but other values may be chosen. It should be noted that the graphics driver and the GPUs may operate asynchronously with the CPU as described above, so that the graphics driver might not know whether the GPUs have finished a particular frame and the GPUs may be rendering a frame that is several frames earlier in the command stream than a current frame in the graphics driver. Where the feedback array is written in a circular fashion, as in process 400 described above, selecting Q to be equal to B provides an average over the B most recently rendered frames. In some embodiments, a weighted average may be used, e.g., giving a larger weight to more recently-rendered frames.

The load coefficient is used to determine whether an adjustment to the clip rectangles for the GPUs needs to be made. If the GPUs are equally loaded, the likelihood of either GPU finishing a frame first is about 50%, and the average value over a suitable number of frames (e.g., 20) will be about 0.5 if identifier values of 0 and 1 are used. An average value in excess of 0.5 indicates that GPU-1 (which renders the bottom portion of the image) is more heavily loaded than GPU-0, and an average value below 0.5 indicates that GPU-0 (which renders the top portion of the image) is more heavily loaded than GPU-1.

Accordingly, at step 510 it is determined whether the load coefficient exceeds a "high" threshold. The high threshold is preselected and may be exactly 0.5 or a somewhat higher value (e.g., 0.55 or 0.6). If the load coefficient exceeds the high threshold, then the loads are adjusted at step 512 by moving the boundary line P in FIG. 2 down by a preset amount (e.g., one line, five lines, ten lines). This reduces the fraction of the display area that is rendered by GPU-1, which will tend to reduce the load on GPU-1 and increase the load on GPU-0. Otherwise, at step 514, it is determined whether the load coefficient is less than a "low" threshold. The low threshold is predefined and may be exactly 0.5 or a somewhat lower value (e.g., 0.45 or 0.4). If the load coefficient is below the low threshold, then the loads are adjusted at step 516 by moving the boundary line P in FIG. 2 up by a preset amount (e.g., one line, five lines, ten lines). At step 518, if the load coefficient is neither above the high threshold nor below the low threshold, the load is considered balanced, and the boundary line P is left unchanged.

After the new boundary line P is determined, a new clip rectangle command is issued for each GPU (step 522) and the process returns to step 504 to wait until it is time to balance the load again. In an alternative embodiment, a new clip rectangle command is issued at step 522 only if the boundary line changes. In conjunction with the new clip rectangle command, a message may be sent to the scanout control logic so that the appropriate display buffer is selected to provide each line of pixel data (e.g., by modifying one or more scanout parameters related to selection of display buffers). Changes in the parameters of the scanout control logic are advantageously synchronized with rendering of the frame in which the new clip rectangle takes effect; accordingly, in some embodiments, the clip rectangle command may also update the scanout parameters in order to display the next rendered frame correctly.

In some embodiments, when the boundary line is shifted to balance the load, it may be useful to transfer data from one display buffer to another. For example, in FIG. 2, suppose that just after GPUs 114$a$, 114$b$ have finished rendering a current frame, the value of P is changed to a larger value P', increasing the number of lines that GPU 114$a$ will render for the next frame. GPU 114$a$ may need access to data for some or all of lines P+1 through P' of the current frame in order to correctly process the next frame. In one embodiment, GPU 114$a$ can obtain the data by a DMA transfer from the portion of display buffer 122$b$ that has the data for lines P+1 through P'. Examples of processes that can advantageously be used for this purpose are described in the above-referenced application Ser. No. 10/643,072, although numerous other processes for transferring data may also be used. It is to be understood that transferring data between display buffers is not required but may be useful in embodiments where any overhead associated with the data transfer is outweighed by the overhead of having one GPU repeat computations previously performed by another GPU. Transferring data that is not displayed (e.g., texture data) between graphics memories 116$a$, 116$b$ may also be desirable in some instances and can be implemented using any of the techniques mentioned above.

It will be appreciated that the processes described herein are illustrative and that variations and modifications are possible. Steps described as sequential may be executed in parallel, order of steps may be varied, and steps may be modified or combined. Optimal selection of the number of frames to average (Q) and/or the frequency of balancing generally depends on various tradeoffs. For instance, a small value of Q provides faster reactions to changes in the scene being rendered, while a larger value of Q will tend to produce more stable results (by minimizing the effect of fluctuations) as well as reducing any effect of an entry in the feedback array for a frame that only one GPU has finished (such an entry would not accurately reflect the last GPU to finish that frame). More frequent balancing may reduce GPU idle time, while less frequent balancing tends to reduce any overhead (such as data transfers between the memories of different GPUs) associated with changing clip rectangles. In one embodiment, checking the balance every 20 frames with Q=B=20 is effective, but in general, optimal values depend on various implementation details. It should be noted that checking the balance can occur quite frequently; e.g., if 30 frames are rendered per second and checking occurs every 20 frames, then the balance may change about every 0.67 seconds.

The identifiers for different GPUs may have any value. Correspondingly, the high threshold and low threshold may have any values, and the two threshold values may be equal (e.g., both equal to 0.5), so long as the high threshold is not less than the low threshold. Both thresholds are advantageously set to values near or equal to the arithmetic mean of the two identifiers; an optimal selection of thresholds in a particular system may be affected by considerations such as the frequency of load rebalancing and any overhead associated with changing the clip rectangles assigned to each GPU. The threshold comparison is advantageously defined such that there is some condition for which the load is considered balanced (e.g., if the average is exactly equal to the arithmetic mean).

Prior to rendering images or writing any feedback data, the feedback array may be initialized, e.g., by randomly selecting either of the GPU identifiers for each entry or by filling alternating entries with different identifiers. Such initialization reduces the likelihood of a spurious imbalance being detected in the event that checking the load balance occurs before the GPUs have written values to all of the entries that are being used to determine the load coefficient.

In one alternative embodiment, the amount by which the partition changes (e.g., the number of lines by which the boundary line P is shifted) may depend on the magnitude of the difference between the load coefficient and the arithmetic mean. For example, if the load coefficient is greater than 0.5 but less than 0.6, a downward shift of four lines might be used, while for a load coefficient greater than 0.6, a shift of eight lines might be used; similar shifts in the opposite direction can be implemented for load coefficients below the arithmetic mean. In some embodiments, the difference in size of the two clip rectangles is limited to ensure that each GPU is always rendering at least a minimum portion (e.g., 10% or 25%) of the display area.

Instead of averaging, a load coefficient may be defined in other ways. For instance, the sum of the recorded identifier values may be used as the load coefficient. In the embodiment described above, with Q=20, the stored identifier values (0 or 1) would sum to 10 if the load is balanced; high and low thresholds may be set accordingly. Other arithmetic operations that may be substituted for those described herein will also be apparent to those of ordinary skill in the art and are within the scope of the present invention.

In another alternative embodiment, different feedback data may be used instead of or in addition to the GPU identifiers described above. For example, instead of providing one feedback array in system memory, with both GPUs writing feedback data to the same location for a given frame, each GPU may write to a corresponding entry of a different feedback array, and the feedback data may include timing information, e.g., a timestamp indicating when each GPU finished a particular frame. In this embodiment, the graphics driver is configured to use the timing information to determine whether one GPU is consistently using more time per frame than another and adjust the clip rectangles accordingly to balance the load. It should be noted that, in some system implementations, timestamps might not accurately reflect the performance of the GPUs; in addition, determining relative loads from sequences of timestamps for each GPU generally requires more computational steps than simply computing a load coefficient as described above. Nevertheless, it is to be understood that embodiments of the invention may include timing information in the feedback data instead of or in addition to GPU identifiers.

Figure 6:
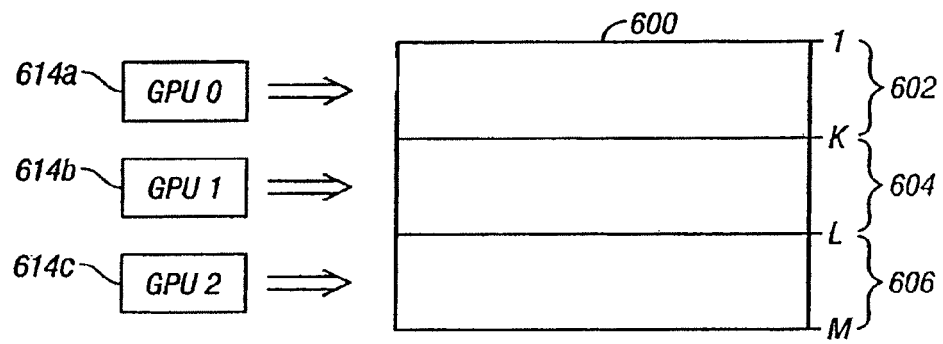
FIG. 6 is an illustration of a display area showing three-way spatial parallelism according to an embodiment of the present invention.

Multi-processor graphics processing systems may include more than two GPUs, and processes 400 and 500 may be adapted for use in such systems. For example, one embodiment of the present invention provides three GPUs, with each GPU being assigned a different horizontal band of the display area, as shown in FIG. 6. An M-line display area 600 is partitioned into a top portion 602 that includes lines 1 through K, a middle portion 604 that includes lines K+1 through L, and a bottom portion 606 that includes lines L+1 through M. Data for top portion 602 is generated by a GPU 614a having an identifier value of "0" (referred to herein as GPU-0); data for middle portion 604 is generated by a GPU 614b having an identifier value of "1" (referred to herein as GPU-1); and data for bottom portion 606 is generated by a GPU 614c having an identifier value of "2" (referred to herein as GPU-2). Load balancing is achieved by adjusting the values of K and L.

Figure 7:
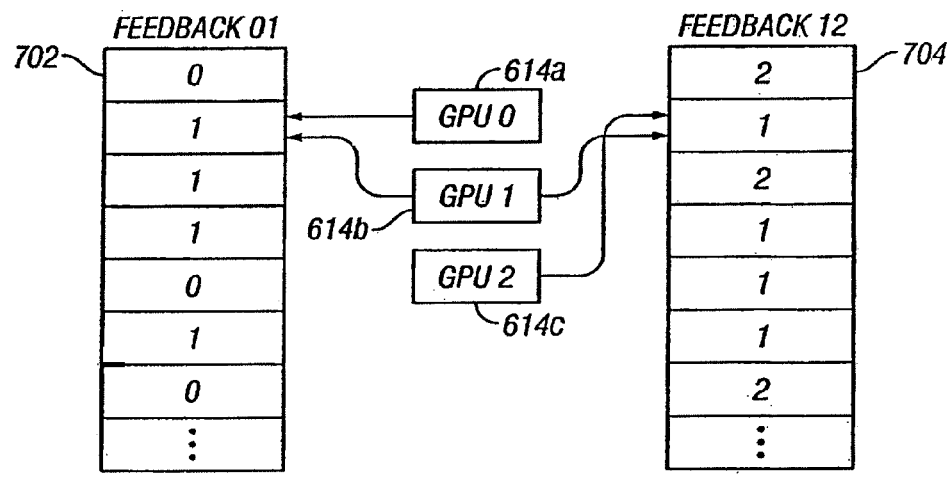
FIG. 7 is an illustration of a pair of feedback arrays for three-way spatial parallelism according to an embodiment of the present invention.

More specifically, in one embodiment, the command stream for each GPU is similar to that of FIG. 3, but two feedback arrays of dimension B (referred to herein as feedback01[0:B−1] and feedback12[0:B−1]) are provided, as shown in FIG. 7. In response to the write notifier command 306, GPU-0 writes its identifier value to a location in the feedback01 array 702 (writing is indicated by arrows in FIG. 7), GPU-1 writes its identifier value to respective locations in both the feedback01 and feedback12 arrays 702, 704, and GPU-2 writes its identifier value to a location in the feedback12 array 704. As a result, an average value of the feedback01 array reflects the relative loads on GPU-0 and GPU-1, while an average value of the feedback12 array reflects the relative loads on GPU-1 and GPU-2.

To balance the loads, the graphics driver adjusts the value of K based on a load coefficient determined from the feedback01 array, e.g., in accordance with process 500 of FIG. 5 described above (with balance occurring when the load coefficient is 0.5), and adjusts the value of L based on a load coefficient determined from the feedback12 array, e.g., in accordance with process 500 (with balance occurring when the load coefficient is 1.5). While the relative loads of GPU-0 and GPU-2 are not directly compared, over time all three loads will tend to become approximately equal. For example, if the load on GPU-1 exceeds the load on GPU-0, the average value of entries in the feedback01 array will exceed 0.5; as a result the value of K will be increased, thereby reducing the load on GPU-1. If the reduced load on GPU-1 becomes less than the load on GPU-2, this disparity will be reflected in the average value of entries in the feedback02 array, which will exceed 1.5; in response, the value of L will be increased, thereby increasing the load on GPU-1 again. This change may lead to a further adjustment in the value of K, and so on. Those of skill in the art will appreciate that over time, this load-balancing process will tend to equalize all three loads. Some instability may persist, but this is acceptable as long as any overhead associated with modifying the clip rectangles in response to new values of K and/or L is sufficiently small.

It will be appreciated that this load-balancing technique may be further extended to systems with any number of GPUs. For instance, the display area can be divided into any number of horizontal bands, with each band being assigned to a different GPU. In such embodiments, the number of feedback arrays is generally one less than the number of GPUs. Alternatively, vertical bands may be used.

It should also be noted that the identifier of a particular GPU need not be unique across all GPUs, as long as the two GPUs that write to each feedback array have identifiers that are different from each other. For example, in the embodiment shown in FIG. 6, GPUs 614a and 614c might both be assigned identifier "0." This would not create ambiguity because, as FIG. 7 shows, these GPUs do not write their identifiers to the same feedback array.

Figure 8:
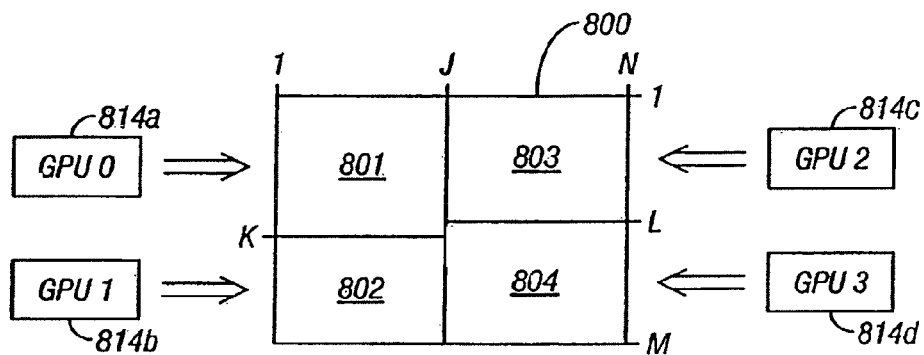
FIG. 8 is an illustration of a display area showing four-way spatial parallelism according to an embodiment of the present invention.

In another alternative embodiment, a combination of horizontal and vertical partitions of the display area may be used to assign portions of the display area to GPUs. For example, FIG. 8 shows a display area 800 consisting of M lines, each containing N pixels, that is divided into four sections 801-804. Sections 801-804 are rendered, respectively, by four GPUs 814a-814d as indicated by arrows. Each GPU 814a-814d is assigned a different identifier value (0, 1, 2, 3). In this embodiment, it may be assumed that complexity of an image is generally about equal between the left and right sides, in which case the vertical boundary line J may remain fixed (e.g., at J=N/2). Two feedback arrays are provided; GPU-0 (814a) and GPU-1 (814b) write their identifiers to a first feedback array feedback01 while GPU-2 (814c) and GPU-3 (814d) write their identifiers to a second feedback array feedback23. The boundary line K that divides sections 801 and 802 is adjusted based on the average value of entries in the feedback01 array, while the boundary line L that divides sections 803 and 804 is adjusted based on the average value of entries in the feedback23 array.

In yet another alternative embodiment, the vertical boundary line J might also be adjustable. For instance, GPU-0 and GPU-1 could each be assigned a secondary (column) identifier value of "0" while GPU-2 and GPU-3 are each assigned a secondary identifier with a value of "1." A third feedback array feedbackC may be provided, with each GPU writing its secondary identifier to the feedbackC array in addition to writing its primary identifier to the appropriate one of the feedback01 and feedback23 arrays. The vertical boundary line J can then be adjusted based on the average value of entries in the feedbackC array. Alternatively, the primary identifier (which has values 0-3) can be associated with the vertical division while the secondary identifier (which has values 0 and 1) is associated with the horizontal division.

Figure 9:
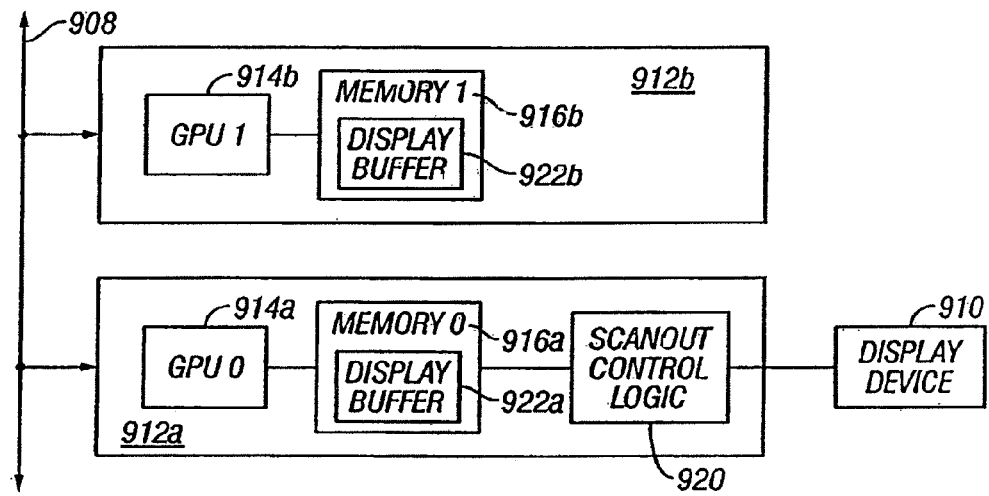
FIG. 9 is a simplified block diagram of a multi-card graphics processing system according to an embodiment of the present invention.

The techniques described herein may also be employed in a "multi-card" graphics processing subsystem in which different GPUs reside on different expansion cards connected by a high-speed bus, such as a PCIX (64-bit PCI Express) bus or a 3GIO (third-generation input/output) bus presently being developed. An example of a multi-card system 900 is shown in FIG. 9. Two graphics cards 912a, 912b are interconnected by a high-speed bus 908; it is to be understood that any number of cards may be included and that high-speed bus 908 generally also connects to other elements of a computer system (e.g., various components of system 100 as shown in FIG. 1). Each graphics card has a respective GPU 914a, 914b and a respective graphics memory 916a, 916b that includes a display buffer 922a, 922b. Card 912a has scanout control logic 920 that provides pixel data from display buffer 922a to a display device 910. Card 912b may also include scanout control logic circuitry, but in this example, card 912b is not connected to a display device and any scanout control logic present in card 912b may be disabled.

In this arrangement, spatial parallelism can be implemented, with each GPU 914a, 914b rendering a portion of each frame to its display buffer 922a, 922b. In order to display the frame, pixel data from display buffer 922b is transferred (e.g., using a conventional block transfer, or Blit, operation) via bus 908 to display buffer 922a, from which it is read by scanout control logic 920.

Figure 10:
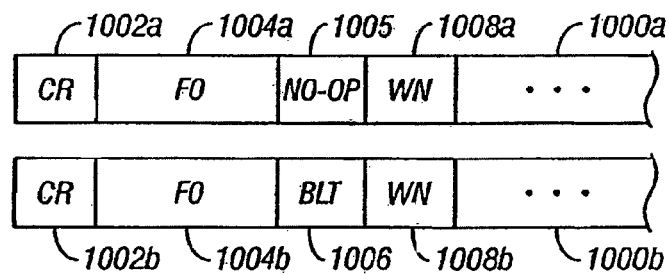
FIG. 10 is an illustration of command streams for a multi-card graphics processing system according to an embodiment of the present invention.

Load balancing as described above can be implemented in this system and advantageously takes into consideration time consumed by the data transfers. For example, FIG. 10 shows respective command streams 1000a, 1000b for GPUs 914a, 914b, which are generally similar to command stream 300 of FIG. 3. Each command stream begins with a clip rectangle command (CR) 1002a, 1002b, followed by rendering commands 1004a, 1004b for a frame F0. As in the single-card embodiments described above, different clip rectangle boundaries are provided for each GPU 914a, 914b so that each renders a different portion of the frame; the rendering commands to each GPU may be identical or different as appropriate for a particular embodiment.

In this embodiment, pixel data from display buffer 922b is transferred to display buffer 922a prior to scanout. Accordingly, for GPU 914b, the rendering commands 1004b are followed by a Blit command 1006 that instructs GPU 914b to transfer pixel data from local display buffer 922b to display buffer 922a on card 912a so that it can be scanned out. Since GPU 914a writes pixel data directly to display buffer 922a, a Blit command is not required in command stream 1000a, so the rendering commands 1004a for GPU 914a are followed by a "no-op" 1005. The no-op may be, e.g., a command that simply delays execution of a following command (such commands are known in the art), no command, or a command instructing GPU 914a to ignore a Blit command that appears in its command stream.

A write notifier command 1008a for frame F0 follows the no-op command 1005 in command stream 1000a, and a corresponding write notifier command 1008b follows Blit command 1006. The write notifier commands 1008a, 1008b may be implemented similarly to the write notifier commands described above with reference to process 400 of FIG. 4. A load balancing process such as process 500 of FIG. 5 may be used to balance the load.

It should be noted that the time required for the Blit operations is accounted for in the load balancing process because the write notifier command 1008b for a frame F0 is not executed by GPU 914b until after the Blit operation for the frame F0 is executed. Thus, the rendering time for GPU 914a is balanced against the rendering time plus the Blit time for GPU 914b.

In some multi-card embodiments used to render scenes in which foreground regions (most often but not always at the bottom of the display area) are consistently more complex than background regions, a performance advantage can be gained by assigning GPU 914a to process the background region of the scene and assigning GPU 914b to process the foreground region. For example, in FIG. 2, suppose that the foreground appears toward the bottom of display area 200. In that case, GPU 914a would be assigned to render top region 202 while GPU 914b would be assigned to render bottom region 204. The higher complexity of the foreground (bottom) region tends to increase the rendering time of GPU 914b. In response, the load-balancing processes described herein will tend to move the boundary line P toward the bottom of the display area. This decreases the number of lines of data included in bottom region 204, which reduces the amount of data that needs to be transferred to display buffer 922a by the Blit command 1006. As a result, more of the processing capacity of GPU 914b may be used for computations rather than data transfers, resulting in a net efficiency gain.

Those of ordinary skill in the art will recognize that a similar implementation might also be used in embodiments of a single-card multi-processor system in which pixel data from all GPUs is transferred to a single display buffer prior to scanout. For example, in system 112 of FIG. 1, data from display buffer 122b might be transferred to display buffer 122a to be scanned out, so that scanout control logic 120 can simply access display buffer 122a to obtain all of the pixel data for a frame. In this embodiment, GPU 114b can be instructed to perform a Blit operation before the write notifier instruction, while GPU 114a is given a no-op.

While the invention has been described with respect to specific embodiments, one skilled in the art will recognize that numerous modifications are possible. For instance, in a multi-processor graphics processing system, any number of GPUs may be included on a graphics card, and any number of cards may be provided; e.g., a four-GPU subsystem might be implemented using two cards with two GPUs each, or a three-GPU subsystem might include a first card with one GPU and a second card with two GPUs. One or more of the GPUs may be a motherboard-mounted graphics co-processor.

Rendering of a display frame may be divided among the GPUs in horizontal bands and/or vertical bands. Those of skill in the art will recognize that use of vertical bands may result in more uniform sizes of the regions rendered by different GPUs (since image complexity usually varies less from left to right than from top to bottom), while use of horizontal bands may simplify the scanout operation in a horizontal row-oriented display device (since only one GPU's display buffer would be accessed to read a particular row of pixels). In addition, a frame may be partitioned among the GPUs along both horizontal and vertical boundaries, and load balancing may be performed along either or both boundaries as described above.

Embodiments of the invention may be implemented using special-purpose hardware, software executing on general-purpose or special-purpose processors, or any combination thereof. The embodiments have been described in terms of functional blocks that might or might not correspond to separate integrated circuit devices in a particular implementation. Although the present disclosure may refer to a general-purpose computing system, those of ordinary skill in the art with access to the present disclosure will recognize that the invention may be employed in a variety of other embodiments, including special-purpose computing systems such as video game consoles or any other computing system that provides graphics processing capability with multiple graphics processors.

Computer programs embodying various features of the present invention may be encoded on computer-readable media for storage and/or transmission; suitable media include magnetic disk or tape, optical storage media such as compact disk (CD) or DVD (digital video disk), flash memory, and carrier signals for transmission via wired, optical, and/or wireless networks conforming to a variety of protocols, including the Internet. Computer-readable media encoded with the program code may be packaged with a compatible device such as a multi-processor graphics card or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method for load balancing in a graphics processing system, the method comprising:

for each of a plurality of rendering processes:
assigning an identifier storage location from a first plurality of storage locations to be a first identifier storage location associated with the rendering process;
assigning a portion of the rendering process to be performed by each of a plurality of graphics processors in the graphics processing system;
instructing the graphics processors to perform the rendering process, wherein each graphics processor performs the portion of the rendering process assigned thereto; and
instructing each of a first pair of the graphics processors to store, upon completion of the portion of the rendering process assigned thereto, a respective processor identifier in the first identifier storage location associated with the rendering process such that the processor identifier of the one of the first pair of the graphics processors that is last to complete the portion of the rendering process assigned thereto overwrites the processor identifier of the one of the first pair of the graphics processors that is first to complete the portion of the rendering process assigned thereto; and for at least the first pair of the graphics processors:
determining, based on the processor identifiers stored in the first plurality of storage locations, whether an imbalance exists between respective loads of the first pair of graphics processors; and
in the event that an imbalance exists, shifting a subset of the portion of the rendering process assigned to a more heavily loaded one of the first pair of graphics processors to the less heavily loaded one of the first pair of graphics processors.

2. The method of claim 1 wherein the portion of the rendering process assigned to each of the plurality of graphics processors includes generating pixel data for a subset of pixels of a frame.

3. The method of claim 1 further comprising, for a second pair of graphics processors selected from the plurality of graphics processors:

for each of the plurality of rendering processes:
assigning an identifier storage location from a second plurality of storage locations to be a second identifier storage location associated with the rendering process;
instructing each of a second pair of the graphics processors to store, upon completion of the portion of the rendering process assigned thereto, a respective processor identifier in the second identifier storage location associated with the rendering process such that the processor identifier of the one of the second pair of the graphics processors that is last to complete the portion of the rendering process assigned thereto overwrites the processor identifier of the one of the second pair of the graphics processors that is first to complete the portion of the rendering process assigned thereto;

determining, based on the processor identifiers in the second plurality of storage locations, whether an imbalance exists between respective loads of the second pair of graphics processors; and
in the event that an imbalance exists, shifting a subset of the portion of the rendering process assigned to a more heavily loaded one of the second pair of graphics processors to the less heavily loaded one of the second pair of graphics processors.

4. The method of claim 3 wherein one of the graphics processors in the first pair of graphics processors also belongs to the second pair of graphics processors.

5. The method of claim 3 wherein neither of the graphics processors in the first pair of graphics processors belongs to the second pair of graphics processors.

6. The method of claim 1 further comprising:
instructing one graphics processor of the first pair of graphics processors to transfer result data from the portion of the rendering process assigned thereto to another one of the plurality of graphics processors.

7. The method of claim 6 wherein the other one of the plurality of graphics processors is the one of the first pair of graphics processors that was not instructed to transfer result data from the portion of the rendering process.

8. The method of claim 6 wherein the act of instructing one graphics processor of the first pair of graphics processors to transfer the result data is performed such that the one graphics processor of the first pair of graphics processors transfers the result data subsequently to performing the rendering process and prior to storing the respective processor identifier in the first identifier storage location associated with the rendering process.

9. The method of claim 1, wherein the processor identifiers include numeric identifiers and wherein determining whether an imbalance exists comprises:
determining, from the first plurality of storage locations, a weighted average of the numeric identifiers provided over a predetermined time period including a current time period, wherein a larger weight is assigned to more recently written numeric identifiers and a smaller weight is assigned to less recently written identifiers; and
determining whether the weighted average satisfies an imbalance criterion.

10. A computer program product comprising a non-transitory computer-readable storage medium storing driver program code that when executed causes a processor to implement a driver for a graphics processing subsystem having a plurality of graphics processors, the driver program code comprising:
program code implementing a command stream generator configured to generate a command stream for the plurality of graphics processors, the command stream including a set of rendering commands for a plurality of rendering processes and a feedback command following a last rendering command for each of the plurality of rendering processes, the feedback command instructing each of at least a first one and a second one of the graphics processors to write a unique processor identifier to a memory location associated with the rendering process such that the unique processor identifier of the one of the first and second graphics processors that is last to execute the feedback command overwrites the unique processor identifier of the one of the first and second graphics processors that is first to execute the feedback command, wherein the memory location is selected from a plurality of memory locations associated with different ones of the plurality of rendering processes;

program code implementing an imbalance detecting module configured to read the plurality of memory locations and to determine, based on the processor identifiers stored therein, whether an imbalance exists between respective loads of the first and second graphics processors; and program code implementing a partitioning module configured to partition a rendering process into a plurality of portions, each portion to be performed by a different one of the graphics processors, the plurality of portions including a first portion to be performed by the first graphics processor and a second portion to be performed by the second graphics processor, wherein the partitioning module is further configured such that, in response to a determination by the imbalance detecting module that an imbalance exists, the partitioning module reparations the rendering process to decrease a size of the one of the first and second portions of the rendering process that is performed by the more heavily loaded one of the first and second graphics processors and to increase a size of the other of the first and second portions of the rendering process.

11. The computer program product of claim 10 wherein the unique processor identifiers include numeric identifiers and wherein the imbalance detecting module is further configured to compute a load coefficient from the numeric identifiers stored in the plurality of memory locations, wherein an imbalance is determined to exist in the event that the load coefficient is greater than a high threshold or is less than a low threshold.

12. The computer program product of claim 10 wherein each rendering process comprises rendering pixels for a frame having a display area and the portions of the rendering process correspond to rendering pixels for different portions of the display area.

13. The computer program product of claim 12 wherein the partitioning module is further configured such that each portion comprises a number of contiguous lines of pixels, the first portion being adjacent to the second portion.

14. The computer program product of claim 13 wherein the partitioning module is further configured to modify the respective sizes of the first and second portions of the display area by shifting one or more rows of pixels from one of the first portion and the second portion to the other of the first portion and the second portion.

15. The computer program product of claim 12 wherein the stream of commands further includes:

a data transfer command instructing the first one of the graphics processors to transfer data for the portion of the display area rendered by the first one of the graphics processors to another one of the graphics processors, wherein the command stream generator is further configured to include the feedback command in the command stream after the data transfer command and before a first rendering command for a next frame.

16. The computer program product of claim 15 wherein the partitioning module is further configured such that when two portions of the display area are expected to consistently differ in complexity, the more complex one of the two portions is assigned to the first graphics processor as the first portion.

17. A computer program product comprising a non-transitory computer readable storage medium storing program code that, when executed, causes a central processor in a computer that includes a plurality of graphics processors to execute a method, the method comprising:

partitioning a display area into at least a first portion to be rendered by a first one of the graphics processors and a second portion to be rendered by a second one of the graphics processors;

generating rendering commands for a frame to the plurality of graphics processors, wherein in response to the rendering commands, the first and second graphics processors perform rendering for the first and second portions of the display area, respectively;

generating a feedback command to at least the first and second graphics processors, wherein in response to the feedback command, the first and second graphics processors each write a unique processor identifier to a memory location associated with the frame, the memory location being one of a plurality of memory locations associated with different frames, wherein when the graphics processors write the feedback data to the memory location, the unique processor identifier of the one of the first and second graphics processors that was last to execute the feedback command overwrites the unique processor identifier of the one of the first and second graphics processors that was first to execute the feedback command;

determining, based on the processor identifiers stored in the plurality of memory locations, whether an imbalance exists between respective loads of the first and second graphics processors; and re-partitioning the display area in the event that an imbalance exists, wherein the re-partitioning decreases a size of the one of the first and second portions of the display area that is rendered by the more heavily loaded one of the first and second graphics processors and increases a size of the other of the first and second portions of the display area.

18. The computer program product of claim 17 wherein each of the unique processor identifiers has a different numeric value and the determining whether an imbalance exists includes:

computing a weighted average of the numeric values of the processor identifiers stored in at least two of the plurality of memory locations; and comparing the load coefficient to an arithmetic mean of the numeric values of the processor identifiers.

19. The computer program product of claim 17 wherein the portion of the display area associated with the first graphics processor is adjacent to the portion of the display area associated with the second graphics processor.

* * * * *